United States Patent
Oshima et al.

(10) Patent No.: US 11,754,671 B2
(45) Date of Patent: Sep. 12, 2023

(54) INCOMING WAVE COUNT ESTIMATION APPARATUS AND INCOMING WAVE COUNT INCOMING DIRECTION ESTIMATION APPARATUS

(71) Applicant: Mitsubishi Electric Corporation, Tokyo (JP)

(72) Inventors: Tadashi Oshima, Tokyo (JP); Yuichi Goda, Tokyo (JP); Nobuhiro Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 520 days.

(21) Appl. No.: 17/044,577

(22) PCT Filed: May 7, 2018

(86) PCT No.: PCT/JP2018/017646
§ 371 (c)(1),
(2) Date: Oct. 1, 2020

(87) PCT Pub. No.: WO2019/215790
PCT Pub. Date: Nov. 14, 2019

(65) Prior Publication Data
US 2021/0199757 A1    Jul. 1, 2021

(51) Int. Cl.
*G01S 7/35*    (2006.01)
*G01S 3/46*    (2006.01)
(Continued)

(52) U.S. Cl.
CPC ............... *G01S 7/354* (2013.01); *G01S 3/46* (2013.01); *G01S 7/497* (2013.01); *G01S 7/4914* (2013.01);
(Continued)

(58) Field of Classification Search
CPC .. G01S 13/931; G01S 13/4463; G01S 13/878; G01S 7/2813; G01S 7/354; G01S 3/46; G01S 3/74
(Continued)

(56) References Cited

U.S. PATENT DOCUMENTS 5,990,834 A * 11/1999 Barrick ................... G01S 13/42
342/195
7,068,221 B2 * 6/2006 Xin ........................... G01S 3/74
342/442

(Continued)

FOREIGN PATENT DOCUMENTS

| JP | 2005-249604 A | 9/2005 |
| WO | 2010/125790 A1 | 11/2010 |
| WO | 2018/042484 A1 | 3/2018 |

OTHER PUBLICATIONS

Hiroyoshi Yamada, "Basics and Practices of High-Resolution Arrival Wave Estimation Method", 33rd Workshop on Design Analysis of Antenna Propagation, IEICE Technical Committee on Antennas and Propagation, pp. 43-69, Tokyo Institute of Technology, Oct. 2006, 31 pages.

(Continued)

*Primary Examiner* — Vladimir Magloire
*Assistant Examiner* — Michael W Justice
(74) *Attorney, Agent, or Firm* — Sughrue Mion, PLLC; Richard C. Turner

(57) ABSTRACT

A subarray spatial averaging unit performs spatial averaging of correlation matrices by dividing a received signal of an array antenna to a plurality of subarrays having different shapes, and calculating these correlation matrices for the respective subarrays having different shapes. An eigenvalue expanding unit performs eigenvalue expansion of correlation matrices for the respective plurality of subarrays having different shapes after spatial averaging. A wave count esti- (Continued)

mating unit estimates an incoming wave count by integrating eigenvalues of the plurality of subarrays having different shapes obtained by the eigenvalue expanding unit.

10 Claims, 12 Drawing Sheets

(51) Int. Cl.
    *G01S 7/4914*     (2020.01)
    *G01S 7/497*     (2006.01)
    *G01S 13/933*     (2020.01)
    *G01S 13/931*     (2020.01)
    *G01S 13/95*     (2006.01)

(52) U.S. Cl.
    CPC ........... *G01S 13/931* (2013.01); *G01S 13/933* (2020.01); *G01S 13/95* (2013.01)

(58) Field of Classification Search
    USPC ... 342/147, 192, 89, 70, 378, 146, 432, 195, 342/189, 108, 145
    See application file for complete search history.

(56) References Cited

U.S. PATENT DOCUMENTS

| | | | | |
|---|---|---|---|---|
| 7,084,812 | B2 * | 8/2006 | Xin | G01S 3/74 342/417 |
| 7,196,656 | B2 * | 3/2007 | Shirakawa | G01S 13/424 356/138 |
| 7,228,244 | B2 * | 6/2007 | Xin | H01Q 1/1257 702/65 |
| 7,391,370 | B2 * | 6/2008 | Xin | G01S 3/74 703/2 |
| 7,450,067 | B2 * | 11/2008 | Xin | G01S 3/74 702/196 |
| 7,679,560 | B2 * | 3/2010 | Xin | H04B 7/086 375/232 |
| 8,446,312 | B2 * | 5/2013 | Kanamoto | G01S 13/04 342/149 |
| 8,730,096 | B2 * | 5/2014 | Kanamoto | G01S 3/74 342/107 |
| 8,730,099 | B2 * | 5/2014 | Kanamoto | G01S 3/74 342/147 |
| 8,816,898 | B2 * | 8/2014 | Shirakawa | G01S 7/40 342/174 |
| 10,326,515 | B2 * | 6/2019 | Oshima | H04B 7/082 |
| 10,359,511 | B2 * | 7/2019 | Wang | G08B 13/19617 |
| 10,433,274 | B2 * | 10/2019 | Jamieson | H04B 17/12 |
| 10,466,345 | B1 * | 11/2019 | Sarrigeorgidis | G01S 5/0221 |
| 10,948,580 | B2 * | 3/2021 | Yamanouchi | G01S 13/40 |
| 2005/0285788 | A1 * | 12/2005 | Xin | G01S 3/46 342/432 |
| 2006/0007043 | A1 * | 1/2006 | Xin | G01S 3/46 342/417 |
| 2006/0066474 | A1 * | 3/2006 | Shirakawa | G01S 13/424 342/155 |
| 2006/0212237 | A1 * | 9/2006 | Xin | G01S 3/74 702/65 |
| 2007/0139268 | A1 * | 6/2007 | Xin | H04B 7/08 342/417 |
| 2007/0164902 | A1 | 7/2007 | Bang et al. | |
| 2009/0079635 | A1 * | 3/2009 | Xin | G01S 3/74 342/373 |
| 2010/0271254 | A1 * | 10/2010 | Kanamoto | G01S 3/74 342/146 |
| 2013/0222173 | A1 * | 8/2013 | Kanamoto | G01S 13/04 342/27 |
| 2013/0229301 | A1 * | 9/2013 | Kanamoto | G01S 13/584 342/158 |
| 2016/0187477 | A1 * | 6/2016 | Wang | G08B 13/19617 342/146 |
| 2016/0345286 | A1 * | 11/2016 | Jamieson | G01S 3/48 |
| 2018/0083689 | A1 * | 3/2018 | Oshima | H04L 7/0087 |
| 2019/0079175 | A1 * | 3/2019 | Yamanouchi | G01S 7/02 |

OTHER PUBLICATIONS

Hamid Krim et al., "Two Decades of Array Signal Processing Research", IEEE Signal Processing Magazine, Jul. 1996, 28 pages.
International search report for PCT/JP2018/017646 dated Jul. 10, 2018.
Written opinion for PCT/JP2018/017646 dated Jul. 10, 2018.

* cited by examiner

INCOMING WAVE COUNT ESTIMATION APPARATUS AND INCOMING WAVE COUNT INCOMING DIRECTION ESTIMATION APPARATUS

CROSS-REFERENCE TO RELATED APPLICATIONS

This application is a National Stage of International Application No. PCT/JP2018/017646 filed May 7, 2018.

TECHNICAL FIELD

The present invention relates to an incoming wave count estimation apparatus for receiving signals such as radio waves, light, and sound waves radiated from a plurality of transmission sources and estimating the number of transmission sources (incoming wave count), and an incoming wave count incoming direction estimation apparatus for estimating the incoming count and an incoming direction.

BACKGROUND ART

In a vehicle-mounted radar for the purpose of collision prevention, autonomous driving, or the like, radio waves radiated from a transmission antenna hitting a target such as a vehicle, person, or obstacle in front and reflected from them are mixed and reach a plurality of reception antennas.

In the vehicle-mounted radar, as a transmission signal, a Frequency Modulated Continuous Wave (FMCW) system, a Fast Chirp system, or the like is generally used. In these systems, an incoming wave count incoming direction estimation apparatus generally has a configuration for estimating incoming directions from radio wave sources by performing Fast Fourier Transform (FFT) processing after mixing received signals reaching the reception antennas with the transmission signal to obtain a beat spectrum, performing detection processing on this spectrum to detect peaks, and performing incoming direction estimation processing on these peaks of the plurality of antennas.

In such an incoming wave count incoming direction estimation apparatus, when relative distances and relative velocities of the radio wave sources are larger than resolution of the FFT, the radio wave sources can be separated on the beat spectrum and estimated. However, when the relative distances and relative velocities are smaller than the resolution of the FFT, signals of these radio wave sources are input as one peak to the incoming direction estimation processing. In this case, the signals of the respective radio wave sources are highly correlated with each other.

As a method for separating highly correlated signals and estimating the incoming directions, there is a spatial averaging type high-resolution incoming direction estimation method in which high-resolution incoming direction estimation method (subspace method such as MUltiple Signal Classification (MUSIC), or Estimation Signal Parameters via Rotational Invariance Technique (ESPRIT)) is applied after an array antenna is formed by combining multiple subarrays having similar shapes and spatial averaging is performed among these subarrays (see, for example, Non-Patent Literature 1). In this method, eigenvalue expansion is performed on a subarray correlation matrix subjected to spatial averaging, and the incoming wave count is estimated from a distribution of eigenvalues of the subarray correlation matrix. Then, after separation into a signal subspace including eigenvectors corresponding to the eigenvalues of the incoming wave estimated and a noise subspace including eigenvectors corresponding to other eigenvalues, the high-resolution incoming direction estimation method is applied.

CITATION LIST

Non-Patent Literature

Non-Patent Literature 1: Hiroyoshi Yamada, "Fundamental and practical aspects of high-resolution incoming wave estimation method," 33rd Design Analysis Workshop on Antennas and Propagation, 2006

SUMMARY OF INVENTION

Technical Problem

A conventional incoming wave count incoming direction estimation apparatus is configured as described above, and spatial averaging is performed, whereby correlation between multiple waves is suppressed, and ideally, the eigenvalues of the subarray correlation matrix overtake noise eigenvalues corresponding to noise power by the amount of incoming wave count, and the incoming wave count can be estimated. However, this correlation suppression effect differs depending on an extraction method of the subarrays having similar shapes, the incoming directions, and the like, and there has been a problem that accurate incoming wave count estimation is difficult.

The present invention has been made to solve the problem as described above, and an object of the present invention is to provide an incoming wave count estimation apparatus that can highly accurately estimate the incoming wave count.

Solution to Problem

An incoming wave count estimation apparatus according to the present invention includes: an array antenna including a plurality of element antennas and for receiving a signal radiated from a radio wave source to be targeted; a subarray spatial averaging unit for performing spatial averaging of correlation matrices by dividing a received signal of the array antenna to a plurality of subarrays having different shapes and calculating these correlation matrices for the respective subarrays having different shapes; an eigenvalue expanding unit for performing eigenvalue expansion of correlation matrices for the respective plurality of subarrays having different shapes after spatial averaging obtained by the subarray spatial averaging unit; and a wave count estimating unit for estimating an incoming wave count by integrating eigenvalues for the respective plurality of subarrays having different shapes obtained by the eigenvalue expanding unit.

Advantageous Effects of Invention

The incoming wave count estimation apparatus of the present invention estimates the incoming wave count by integrating the eigenvalues for the respective plurality of subarrays having different shapes obtained by the eigenvalue expanding unit. As a result, it is possible to estimate the incoming wave count with high accuracy.

DESCRIPTION OF EMBODIMENTS

Hereinafter, to explain the present invention in more detail, embodiments for carrying out the present invention will be described by referring to the accompanying drawings.

Note that, in the following embodiments, an incoming wave count estimation apparatus and an incoming wave count incoming direction estimation apparatus will be described assuming application to a vehicle-mounted radar mainly for the purpose of collision prevention or autonomous driving; however, the present invention can be applied not only to vehicle-mounted radars but also to aircraft surveillance radars and weather radars. Furthermore, it can be applied to receiving apparatuses such as an interfering radio wave receiving apparatus and a satellite communication apparatus.

First Embodiment

Figure 1:
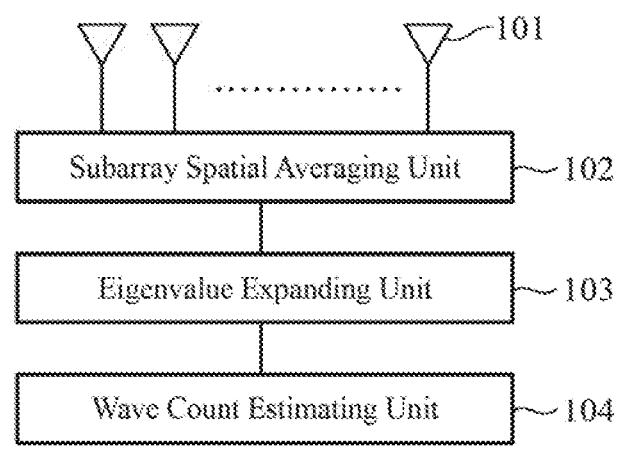
FIG. 1 is a configuration diagram of an incoming wave count estimation apparatus according to a first embodiment of the present invention.

FIG. 1 is a configuration diagram of an incoming wave count estimation apparatus according to the present embodiment.

The incoming wave count estimation apparatus illustrated in FIG. 1 includes an array antenna 101, a subarray spatial averaging unit 102, an eigenvalue expansion unit 103, and a wave count estimating unit 104.

The array antenna 101 is an array antenna including a plurality of element antennas, and has a function of receiving a signal from a radio wave source. Note that, as will be described in a fourth embodiment, a received signal of the array antenna 101 is subjected to signal amplification, frequency conversion (or mixing with a transmission signal), band limitation, and A/D conversion, thereby being converted into a digital signal. In the vehicle-mounted radar, in general, a received signal is mixed with a transmission signal, is converted into a beat signal having a low beat frequency, and then is subjected to band limitation and A/D conversion. As the transmission signal, here, a linear frequency modulation (chirp modulation) waveform is assumed in which the frequency increases in proportion to time; however, in addition, there are, for example, a pulsed modulation waveform, a phase code modulation waveform in which the phase changes with time, and a frequency modulation waveform in which the frequency of a CW signal that is a continuous wave changes with time.

The subarray spatial averaging unit 102 is a functional unit for performing spatial averaging of correlation matrices by dividing the received signal of the array antenna 101 to a plurality of subarrays having different shapes, and calculating these correlation matrices for the respective subarrays having different shapes. The eigenvalue expanding unit 103 is a functional unit for performing eigenvalue expansion of the correlation matrices for the respective plurality of subarrays having different shapes after spatial averaging obtained by the subarray spatial averaging unit 102. The wave count estimating unit 104 is a functional unit for estimating an incoming wave count by integrating the eigenvalues for the respective plurality of subarrays having different shapes obtained by the eigenvalue expanding unit 103.

Figure 2:
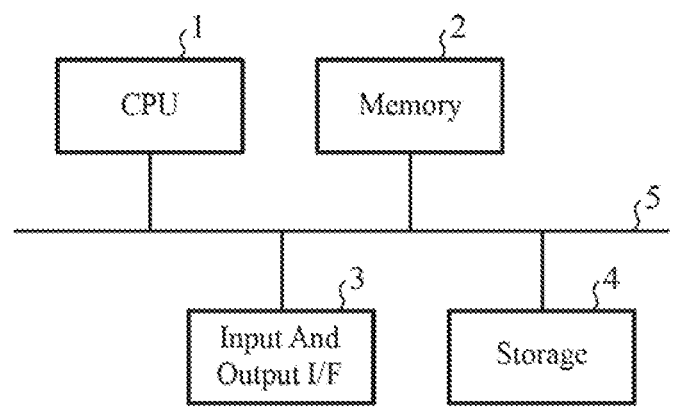
FIG. 2 is a hardware configuration diagram of the incoming wave count estimation apparatus according to the first embodiment of the present invention.

FIG. 2 is a configuration diagram of hardware including the units from the subarray spatial averaging unit 102 to the wave count estimating unit 104 in the incoming wave count estimation apparatus. The illustrated hardware includes a CPU 1, a memory 2, an input and output I/F 3, a storage 4, and a bus 5. The CPU 1 is a computing unit for executing programs corresponding to the units from the subarray spatial averaging unit 102 to the wave count estimating unit 104 to implement these functional units. The memory 2 is a storage unit such as a RAM for storing various data and forming a work area of the CPU 1. The input and output I/F 3 is an interface for inputting the received signal from the array antenna 101 and outputting the wave count estimated by the wave count estimating unit 104. The storage 4 is a storage unit for storing the programs corresponding to the units from the subarray spatial averaging unit 102 to the wave count estimating unit 104. The bus 5 is a communication path for connecting these units, the CPU 1 to the storage 4, to each other.

Figure 3:
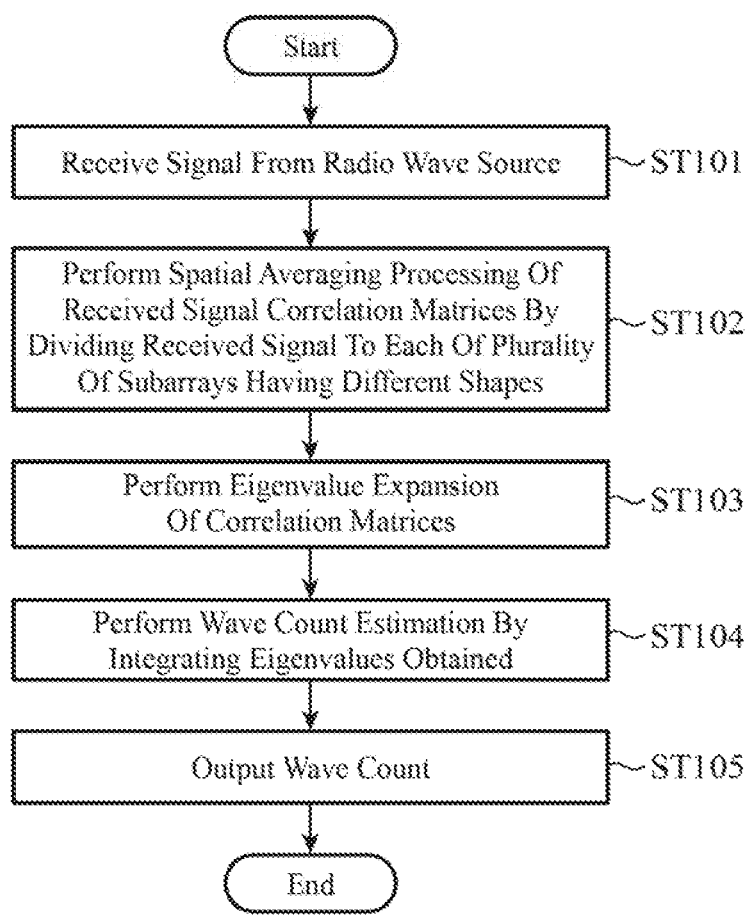
FIG. 3 is a flowchart illustrating operation of the incoming wave count estimation apparatus according to the first embodiment of the present invention.

Next, the operation of the incoming wave count estimation apparatus of a first embodiment will be described by referring to a flowchart in FIG. 3.

Figure 4A:
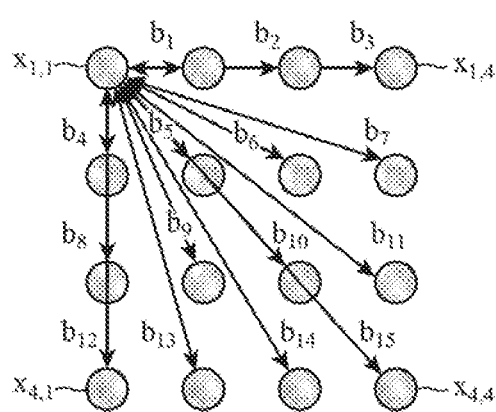
FIGS. 4A to 4C are explanatory diagrams of a subarray division procedure of the incoming wave count estimation apparatus according to the first embodiment of the present invention.

The array antenna 101 receives the signal from the radio wave source by the plurality of element antennas and outputs the signal as a digital signal (step ST101). Next, the subarray spatial averaging unit 102 performs spatial averaging processing of received signal correlation matrices by dividing the received signal of the array antenna 101 for each of the plurality of subarrays having different shapes (step ST102). FIG. 4 is an explanatory diagram of a subarray division procedure. In FIG. 4, it is assumed that the array antenna 101 is a two-dimensional array including 4×4=16 element antennas.

Figure 4B:
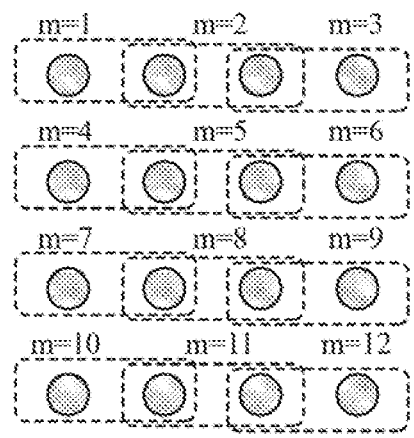
Figure 4C:
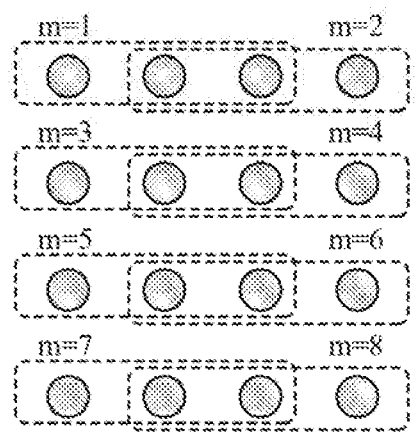

It is considered to extract multiple subarrays including two element antennas from the array antenna 101. In this case, it is possible to extract a total of N=15 different subarrays as illustrated in b1 to b15 of FIG. 4A. When focusing on one of these subarrays, for example, b1, M=12 similar subarrays are obtained as illustrated in FIG. 4B, so that spatial averaging processing can be performed 12 times on b1. A correlation matrix after spatial averaging in the n-th subarray can be expressed as the following equations (1) and (2). Note that, when focusing on b2, the spatial averaging processing can be performed eight times, as illustrated in FIG. 4C.

$$R_{xx}^{(n)} = \frac{1}{M^{(n)}} \sum_{m=1}^{M^{(n)}} x^{(n,m)}(x^{(n,m)})^H \quad (n = 1, 2, \ldots, N) \tag{1}$$

$$x^{(n,m)} := \begin{bmatrix} x_k^{(n,m)} \\ x_l^{(n,m)} \end{bmatrix} \tag{2}$$

Here, a superscript (n) represents an index of the multiple different subarrays, a superscript (m) represents an index of the similar subarrays for each subarray, x^(n, m) represents a received signal vector of the m-th similar subarray in the n-th subarray, k^(n, m) and l^(n, m) represent indices of the element antennas constituting the subarray, and M^(n) represents the number of times of spatial averaging (the number of similar subarrays) in the n-th subarray. The Hermitian transpose of a vector x is represented by x^H.

To perform further correlation suppression, a correlation matrix after improved spatial averaging may be obtained, in which, for example, Forward/Backward averaging (F/B averaging) described in Non-Patent Literature 1 is applied to the correlation matrix after spatial averaging as indicated in the following equation (3).

$$\bar{R}_{xx}^{(n)} := \frac{1}{2}(R_{xx}^{(n)} + J(R_{xx}^{(n)})^* J) \tag{3}$$

Here, x^(*) represents a complex conjugate of x, and J is an exchange matrix represented by the following equation (4).

$$J := \begin{bmatrix} 0 & 1 \\ 1 & 0 \end{bmatrix} \tag{4}$$

Furthermore, to reduce the amount of calculation, unitary transformation may be performed as indicated in the following equation (5) to make the correlation matrix of a real number.

$$\bar{R}_{xx}^{(n)} := \text{Re}\{Q^H \bar{R}_{xx}^{(n)}\} \tag{5}$$

Here, Re{x} represents a real part of x, and Q represents a unitary transformation matrix represented by the following equation (6).

$$Q := \begin{bmatrix} 1 & j \\ 1 & -j \end{bmatrix} \tag{6}$$

By performing unitary transformation as described above, the correlation suppression effect is similar to that of F/B averaging, and a complex signal can be converted into a real signal, so that there is an advantage that the amount of calculation of eigenvalue expansion can be reduced. Note that, to perform these F/B averaging and unitary transformation, the subarray needs to be point-symmetric.

The eigenvalue expanding unit 103 performs eigenvalue expansion of the correlation matrix Rxx^(bar)^(n) obtained by the subarray spatial averaging unit 102 (step ST103). The wave count estimating unit 104 performs wave count estimation by integrating the eigenvalues obtained by the eigenvalue expanding unit 103 (step ST104), and outputs the obtained wave count (step ST105).

Figure 5:
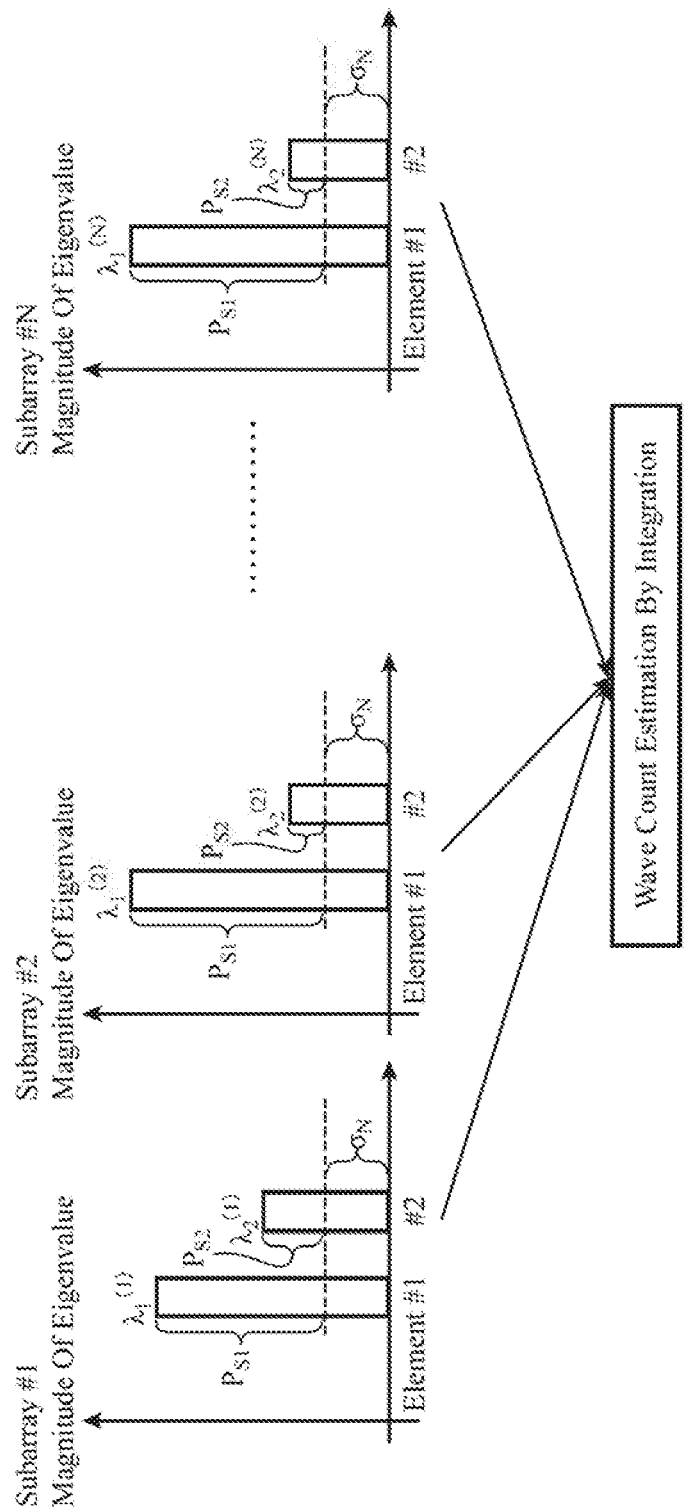
FIG. 5 is an explanatory diagram regarding integration of eigenvalues of the incoming wave count estimation apparatus according to the first embodiment of the present invention.

As described in Non-Patent Literature 1, the correlation suppression effect by spatial averaging in the case of two targets depends on the number of times of spatial averaging M^(n) and an element interval Δd in the subarray, and decreases while oscillating like a sinc function with an increase of an angle difference between the two targets. That is, the correlation suppression effect differs depending on a shape of a subarray n and angles of the two targets, and as a result, calculated eigenvalues greatly change. Since the target angle is unknown before processing, the optimal subarray shape is unknown. Thus, it is considered to accurately estimate the incoming wave count by obtaining all the eigenvalues of the multiple N different subarrays and integrating these eigenvalues. FIG. 5 illustrates an explanatory diagram regarding the integration of the eigenvalues.

In FIG. 5, an eigenvalue of the n-th subarray is represented by λk^(n) (k=1, 2). Since the number of elements in the subarray is two for the sake of simplicity, two eigenvalues are obtained after the eigenvalue expansion of the correlation matrix. As a means for integrating the eigenvalues in the wave count estimating unit 104, it is considered to average all the eigenvalues of N subarrays as indicated in the following equation (7).

$$\bar{\lambda}_k^{(n)} := \sum_{n=1}^{N} w^{(n)} \lambda_k^{(n)} \quad (k = 1, 2) \tag{7}$$

Here, w^(n) is a weight, and can be set, for example, as in the following equation (8).

$$w^{(n)} := \frac{\sqrt{M^{(n)}}}{\sum_{n=1}^{N} \sqrt{M^{(n)}}} \tag{8}$$

If the noise is uncorrelated between the element antennas, the noise reduction effect is proportional to the square root of the number of times of spatial averaging M^(n), so that the larger the number of times of spatial averaging, the greater the noise reduction effect. Thus, by averaging the eigenvalues by applying a larger weight as the number of times of spatial averaging M^(n) increases, a smaller weight is applied to an eigenvalue having a small noise reduction effect, and the contribution of the eigenvalue can be reduced. Furthermore, it is also possible to simply remove eigenvalues having a small number of times of spatial averaging and perform averaging.

A certain threshold value is set for the eigenvalue $\hat{\lambda}_k$ (tilde)^(n) calculated in this way, and the incoming wave count can be determined using the eigenvalue exceeding the threshold value as a signal. As for the threshold value, a Signal to Noise Ratio (SNR) equivalent after target detection can be set for the minimum eigenvalue (second eigenvalue). This is because the minimum eigenvalue corresponds to noise power, and the eigenvalue of the target corresponds to signal power+noise power, in the case of one target and where the number of subarray elements are two. Furthermore, a configuration may be adopted in which the threshold value is set by performing arithmetical averaging and geometrical averaging of the eigenvalues. Alternatively, the incoming wave count can be determined in accordance with an information criterion such as Akaike Information Criteria (AIC) or Minimum Description Length (MDL).

In the above example, it has been considered to perform weighted averaging of the eigenvalues of the multiple different subarrays; however, by performing the averaging operation, the eigenvalue of the subarray with a high correlation suppression effect are affected by the subarray with a low correlation suppression effect, and a case occur where sufficient correlation suppression cannot be exerted. Thus, as indicated in the following equation (9), a ratio between the first eigenvalue and the second eigenvalue is obtained for all the subarrays n, and the minimum value $\alpha\_(1, 2)$ of the ratio is calculated.

$$\alpha_{1,2} := \min_n \frac{\lambda_1^{(n)}}{\lambda_2^{(n)}} \quad (n = 1, 2, \ldots, N) \quad (9)$$

Here, min_(n) represents minimization for the subarray n. The $\alpha\_(1, 2)$ is compared with a certain threshold value $\alpha\_\text{th}(1, 2)$, and it can be determined that the incoming wave count is one if the $\alpha\_(1, 2)$ is less than or equal to the threshold value, and the incoming wave count is two or more if the $\alpha\_(1, 2)$ is greater than or equal to the threshold value. A case has been described where the number of elements of the subarray is two; however, when the number of elements of the subarray is three or more, $\alpha\_(2, 3)$ is calculated as indicated in the following equation (10) similarly, and compared with a threshold value $\alpha\_\text{th}(2, 3)$, whereby it can be estimated that the incoming wave count is two if the $\alpha\_(2, 3)$ is greater than or equal to the threshold value, and the incoming wave count is three if the $\alpha\_(2, 3)$ is less than or equal to the threshold value.

$$\alpha_{2,3} := \min_n \frac{\lambda_2^{(n)}}{\lambda_3^{(n)}} \quad (n = 1, 2, \ldots, N) \quad (10)$$

It is conceivable that the threshold values $\alpha\_\text{th}(1, 2)$ and $\alpha\_\text{th}(2, 3)$ are set to, for example, a value similar to the Signal to Noise Ratio (SNR) at the time of target detection. As illustrated in FIG. 5, when the incoming wave count is one, an eigenvalue $\lambda 1$ is target signal power $P_{s1}$+noise power $\sigma N$, and an eigenvalue $\lambda 2$ is the noise power $\sigma N$, so that a ratio between $\lambda 1$ and $\lambda 2$ ideally corresponds to the SNR. Even when the incoming wave count is two, ideally a ratio between the second eigenvalue and the third eigenvalue is the SNR equivalent, so that it is possible to set a threshold value equivalent to the SNR for the $\alpha\_\text{th}(2, 3)$. Even when the number of subarray elements is four or more, it is possible to similarly calculate a ratio between the eigenvalues and set threshold values. Furthermore, these threshold values may be set by numerical simulation or experiments in advance.

Note that, by replacing the denominator and the numerator to each other of the ratio of the above equations (9) and (10), the maximum value of the ratio between the first eigenvalue and the second eigenvalue is obtained, and the maximum value may be compared with the threshold value.

As described above, according to the incoming wave count estimation apparatus of the first embodiment, the incoming wave count estimation apparatus includes: an array antenna including a plurality of element antennas and for receiving a signal radiated from a radio wave source to be targeted; a subarray spatial averaging unit for performing spatial averaging of correlation matrices by dividing a received signal of the array antenna to a plurality of subarrays having different shapes and calculating these correlation matrices for the respective subarrays having different shapes; an eigenvalue expanding unit for performing eigenvalue expansion of correlation matrices for the respective plurality of subarrays having different shapes after spatial averaging obtained by the subarray spatial averaging unit; and a wave count estimating unit for estimating an incoming wave count by integrating eigenvalues for the respective plurality of subarrays having different shapes obtained by the eigenvalue expanding unit, so that it is possible to estimate the incoming wave count with high accuracy without depending on the angle of the radio wave source to be targeted and the shape of the subarray.

Furthermore, according to the incoming wave count estimation apparatus of the first embodiment, the wave count estimating unit estimates the wave count from an eigenvalue distribution after weighted averaging of the eigenvalues for the respective plurality of subarrays having different shapes, so that it is possible to estimate the incoming wave count with higher accuracy.

Furthermore, according to the incoming wave count estimation apparatus of the first embodiment, the wave count estimating unit estimates the wave count by obtaining ratios for the respective element antennas of the eigenvalues for the respective plurality of subarrays having different shapes, and then comparing the ratios for each of the subarrays, and comparing a minimum or maximum value with a threshold value, so that it is possible to estimate the incoming wave count with higher accuracy.

Second Embodiment

In the first embodiment, spatial averaging of the correlation matrices regarding the plurality of subarrays having different shapes is performed, and all the eigenvalues of the correlation matrices after the spatial averaging are integrated, whereby the wave count is estimated, so that when there are a large number of subarrays having different shapes, the eigenvalue expansion corresponding to that amount is necessary, which may significantly increase the amount of calculation. Thus, in a second embodiment, a second subarray spatial averaging unit and a second wave count estimating unit are provided, and when the wave count estimated by the first wave count estimating unit exceeds a threshold value, spatial averaging and eigenvalue expansion are performed using another subarray having a larger number of elements in the subarray than in the first subarray spatial averaging unit, and wave count estimation is performed again.

Figure 6:
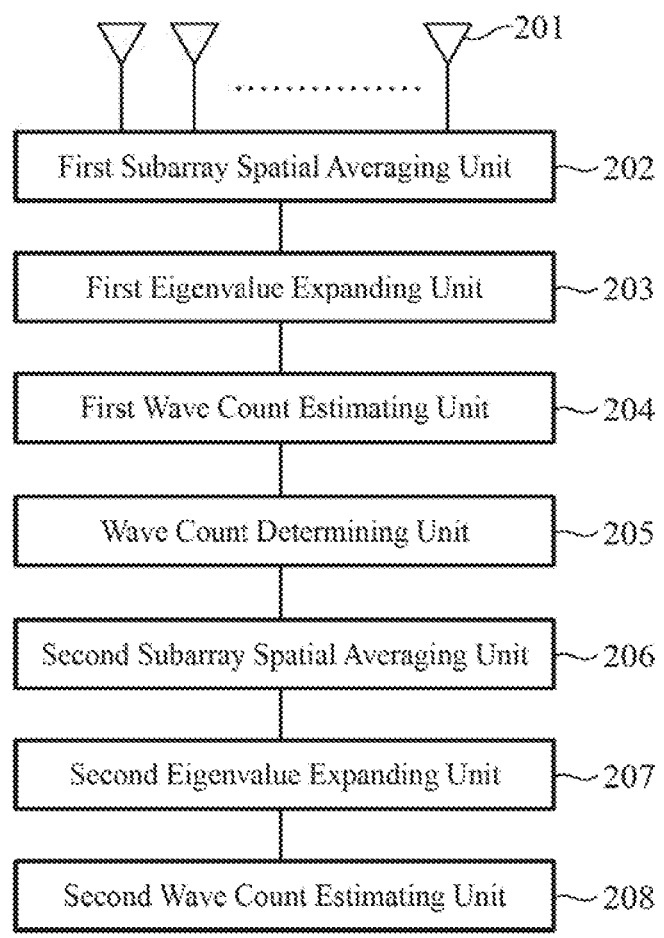
FIG. 6 is a configuration diagram of an incoming wave count estimation apparatus according to a second embodiment of the present invention.

FIG. 6 is a configuration diagram of an incoming wave count estimation apparatus according to the second embodiment. The incoming wave count estimation apparatus according to the second embodiment includes an array antenna 201, a first subarray spatial averaging unit 202, a first eigenvalue expanding unit 203, a first wave count estimating unit 204, a wave count determining unit 205, and a second subarray spatial averaging unit 206, a second eigenvalue expanding unit 207, and a second wave count estimating unit 208.

The array antenna 201 has a configuration similar to that of the array antenna 101 of the first embodiment. Furthermore, basic configurations of the units from the first subarray spatial averaging unit 202 to the first wave count estimating unit 204 are similar to those of the units from the subarray spatial averaging unit 102 to the wave count estimating unit 104 of the first embodiment; however, the number of elements in one subarray is set to two or three. The wave count determining unit 205 is a functional unit for determining whether or not an incoming wave count estimated by the first wave count estimating unit 204 exceeds a set threshold value. The second subarray spatial averaging unit 206 is a functional unit for performing spatial averaging of correlation matrices by performing division to subarrays having a larger number of elements than subarrays divided by the first subarray spatial averaging unit 202 when the incoming wave count exceeds the threshold value in the wave count determining unit 205. The second eigenvalue expanding unit 207 is a functional unit for performing eigenvalue expansion of the correlation matrices obtained by the second subarray spatial averaging unit 206. The second wave count estimating unit 208 is a functional unit for estimating the incoming wave count by integrating the eigenvalues of multiple subarrays obtained by the second eigenvalue expanding unit 207.

That is, in the incoming wave count estimation apparatus of the second embodiment, the first subarray spatial averaging unit 202 sets the number of elements per subarray to two or three to reduce the amount of calculation. In this case, when the incoming wave count exceeds the number of elements in one subarray, accurate wave count estimation cannot be performed. Thus, the second subarray spatial averaging unit 206 and the second wave count estimating unit 208 are provided, and when the wave count estimated by the first wave count estimating unit 204 exceeds the threshold value, spatial averaging and eigenvalue expansion are performed using another subarray having a larger number of elements in the subarray than in the first subarray spatial averaging unit 202, and wave count estimation is performed again. With such a configuration, when the wave count is less than the number of elements in the subarray of the first subarray spatial averaging unit 202, accurate wave count estimation can be performed by the first wave count estimating unit 204, and when the wave count is greater than the number of elements in the subarray, the wave count estimation can be performed by the second wave count estimating unit 208.

The effect of the second embodiment is large when the number of times of wave count estimation is large and the actual incoming wave count is two or three or less. For example, when wave count estimation is performed 100 times, when the incoming wave count is one in 50 times, the wave count estimation is performed by the first wave count estimating unit 204 50 times, and for the remaining 50 times, the wave count estimation is performed by the second wave count estimating unit 208. By doing so, it is possible to reduce the amount of calculation of entire wave count estimation processing as compared with a case where all the 100 times of wave count estimation is performed by the second wave count estimating unit 208. This is because the amount of calculation of eigenvalue expansion is dominant in the amount of calculation during wave count estimation.

Figure 7:
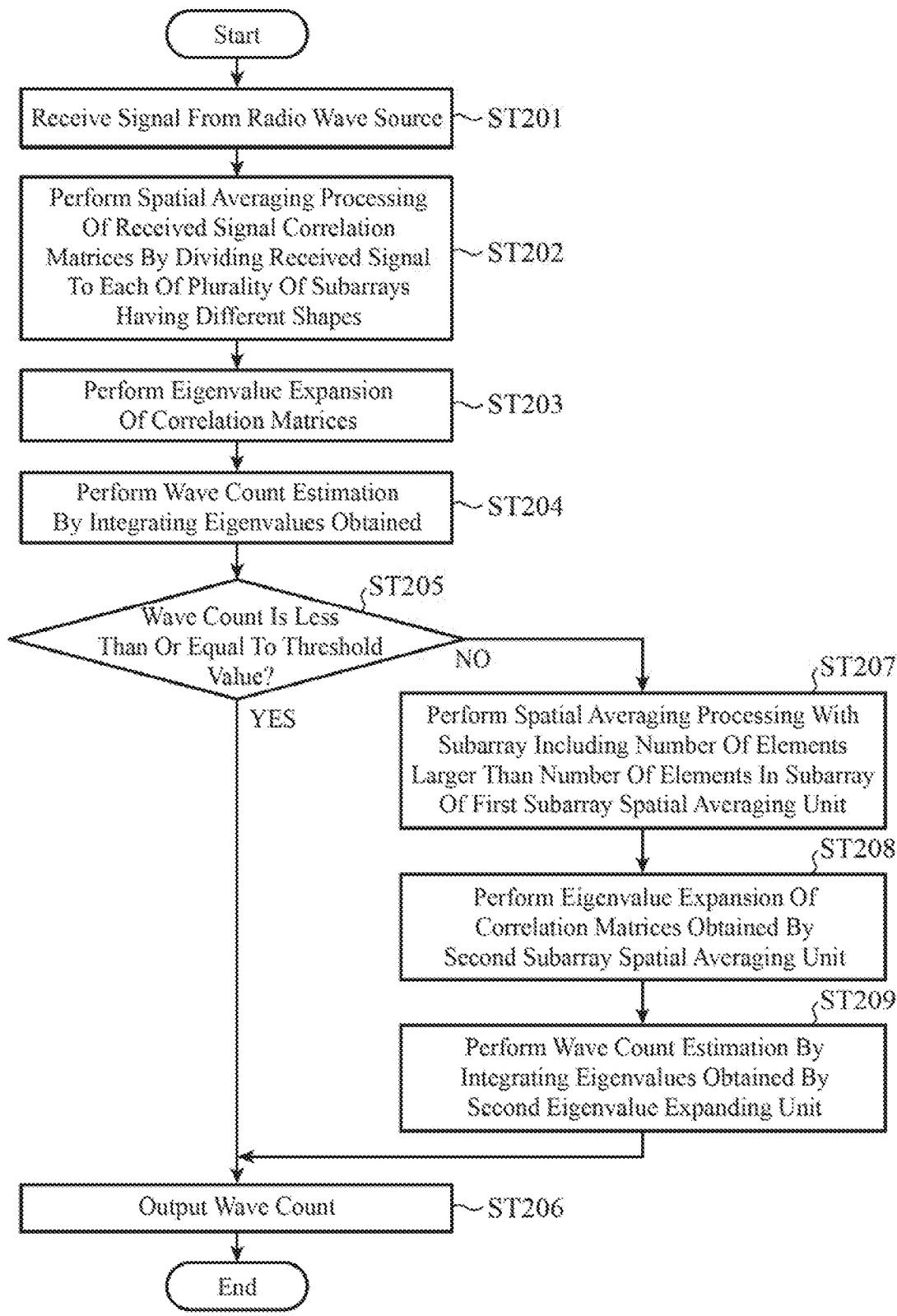
FIG. 7 is a flowchart illustrating operation of the incoming wave count estimation apparatus according to the second embodiment of the present invention.

Hereinafter, the operation of the incoming wave count estimation apparatus of the second embodiment will be described by referring to a flowchart of FIG. 7.

In step ST201, the array antenna 201 receives the signal from the radio wave source, similarly to step ST101. Next, the first subarray spatial averaging unit 202 performs processing of a case where the number of elements in one subarray is set to two or three in the processing of the subarray spatial averaging unit 102 of the first embodiment (step ST202). As a result, the first eigenvalue expanding unit 203 performs eigenvalue expansion of the correlation matrices for the respective plurality of subarrays having different shapes after spatial averaging obtained by the first subarray spatial averaging unit 202 (step ST203), and the first wave count estimating unit 204 performs wave count estimation by integrating the eigenvalues obtained by the first eigenvalue expanding unit 203 for the respective plurality of subarrays having different shapes (step ST204). That is, the first wave count estimating unit 204 performs the processing of a case where the number of elements in one subarray is two or three in the wave count estimating unit 104 of the first embodiment.

In the wave count determining unit 205, the wave count estimated by the first wave count estimating unit 204 is compared with a set threshold value in advance, and if the wave count is less than or equal to the threshold value (step ST205—YES), the estimated wave count is output as it is (step ST206), and If the wave count exceeds the threshold value (step ST205—NO), the processing proceeds to processing by the second subarray spatial averaging unit 206 (step ST207). It is conceivable that M1 is set for the threshold value for this wave count determination, for example, where M1 is the number of elements in the subarray in the first subarray spatial averaging unit 202. This is because, as described above, the number of eigenvalues is a limit of the wave count estimated by the first wave count estimating unit 204, so that the incoming wave count exceeding M1 cannot be accurately estimated.

Figure 8A:
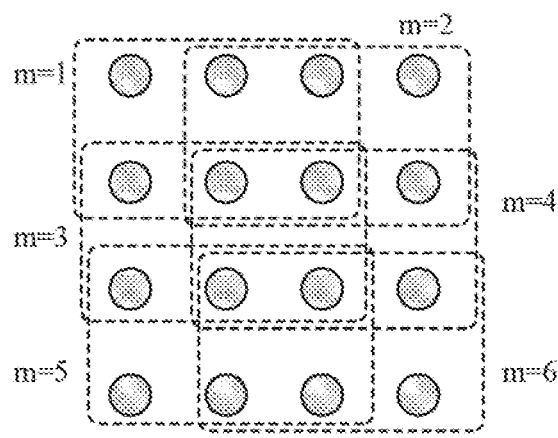
FIGS. 8A and 8B are explanatory diagrams illustrating examples of subarray division of a second subarray spatial averaging unit of the incoming wave count estimation apparatus according to the second embodiment.
Figure 8B:
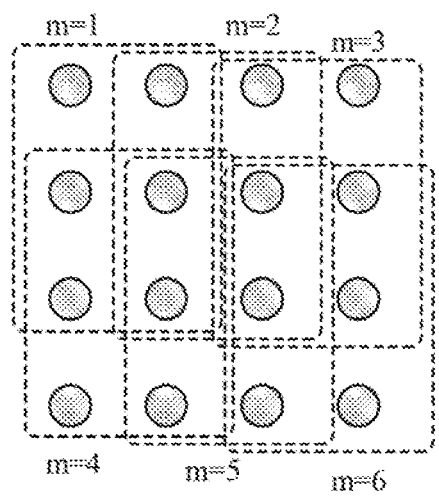

The second subarray spatial averaging unit 206 performs spatial averaging with a subarray formed by a larger number of elements than the number of elements in the subarray of the first subarray spatial averaging unit 202 (step ST207). A configuration may be adopted in which spatial averaging is performed of the plurality of subarrays having different shapes similarly to the first subarray spatial averaging unit 202, or a configuration may be adopted in which averaging is performed on subarrays having the same shape. FIGS. 8A and 8B illustrate examples of subarray division in the second subarray spatial averaging unit 206. In this example, spatial averaging is performed on a 4-element subarray. FIG. 8A illustrates an example of four elements in the horizontal direction of the drawing, and FIG. 8B illustrates an example of four elements in the vertical direction of the drawing. Two subarray shapes can be extracted, and each can perform spatial averaging six times. Furthermore, similarly to the subarray spatial averaging unit 102 of the first embodiment, Forward/Backward averaging and unitary transformation may be performed.

The second eigenvalue expanding unit 207 performs eigenvalue expansion of the correlation matrices averaged by the second subarray spatial averaging unit 206 (step ST208). The second wave count estimating unit 208 performs wave count estimation on the basis of the eigenvalues calculated by the second eigenvalue expanding unit 207

(step ST209). The wave count estimating method is similar to that of the wave count estimating unit 104 of the first embodiment, and description thereof is therefore omitted here. The wave count estimated by the second wave count estimating unit 208 is finally output as the wave count (step ST206).

As described above, in the second embodiment, the wave count is estimated by the first wave count estimating unit 204 when the actual incoming wave count is small, and the wave count is estimated by the second wave count estimating unit 208 when the incoming wave count is large, whereby it is possible to reduce the amount of calculation of entire processing of wave count estimation.

As described above, according to the incoming wave count estimation apparatus of the second embodiment, the incoming wave count estimation apparatus of the second embodiment include: an array antenna including a plurality of element antennas and for receiving a signal radiated from a radio wave source to be targeted; a first subarray spatial averaging unit for performing spatial averaging of correlation matrices by dividing a received signal of the array antenna to a plurality of subarrays having different shapes and calculating these correlation matrices for the respective subarrays having different shapes; a first eigenvalue expanding unit for performing eigenvalue expansion of correlation matrices for the respective plurality of subarrays having different shapes after spatial averaging obtained by the first subarray spatial averaging unit; a first wave count estimating unit for estimating an incoming wave count by integrating eigenvalues for the respective plurality of subarrays having different shapes obtained by the first eigenvalue expanding unit; a wave count determining unit for determining whether or not the incoming wave count estimated by the first wave count estimating unit exceeds a set threshold value; a second subarray spatial averaging unit for performing spatial averaging of correlation matrices by performing division to subarrays having a larger number of elements than the subarrays divided by the first subarray spatial averaging unit when the incoming wave count exceeds the threshold value in the wave count determining unit; a second eigenvalue expanding unit for performing eigenvalue expansion of correlation matrices obtained by the second subarray spatial averaging unit; and a second wave count estimating unit for estimating the incoming wave count by integrating eigenvalues of the plurality of subarrays obtained by the second eigenvalue expanding unit, in which the incoming wave count estimated by the first wave count estimating unit is output when the incoming wave count is less than or equal to the threshold value in determination in the wave count determining unit, so that it is possible to reduce the amount of calculation of entire processing of wave count estimation.

Third Embodiment

A third embodiment is an example of an incoming wave count incoming direction estimation apparatus for estimating an incoming direction in addition to an incoming wave count.

Figure 9:
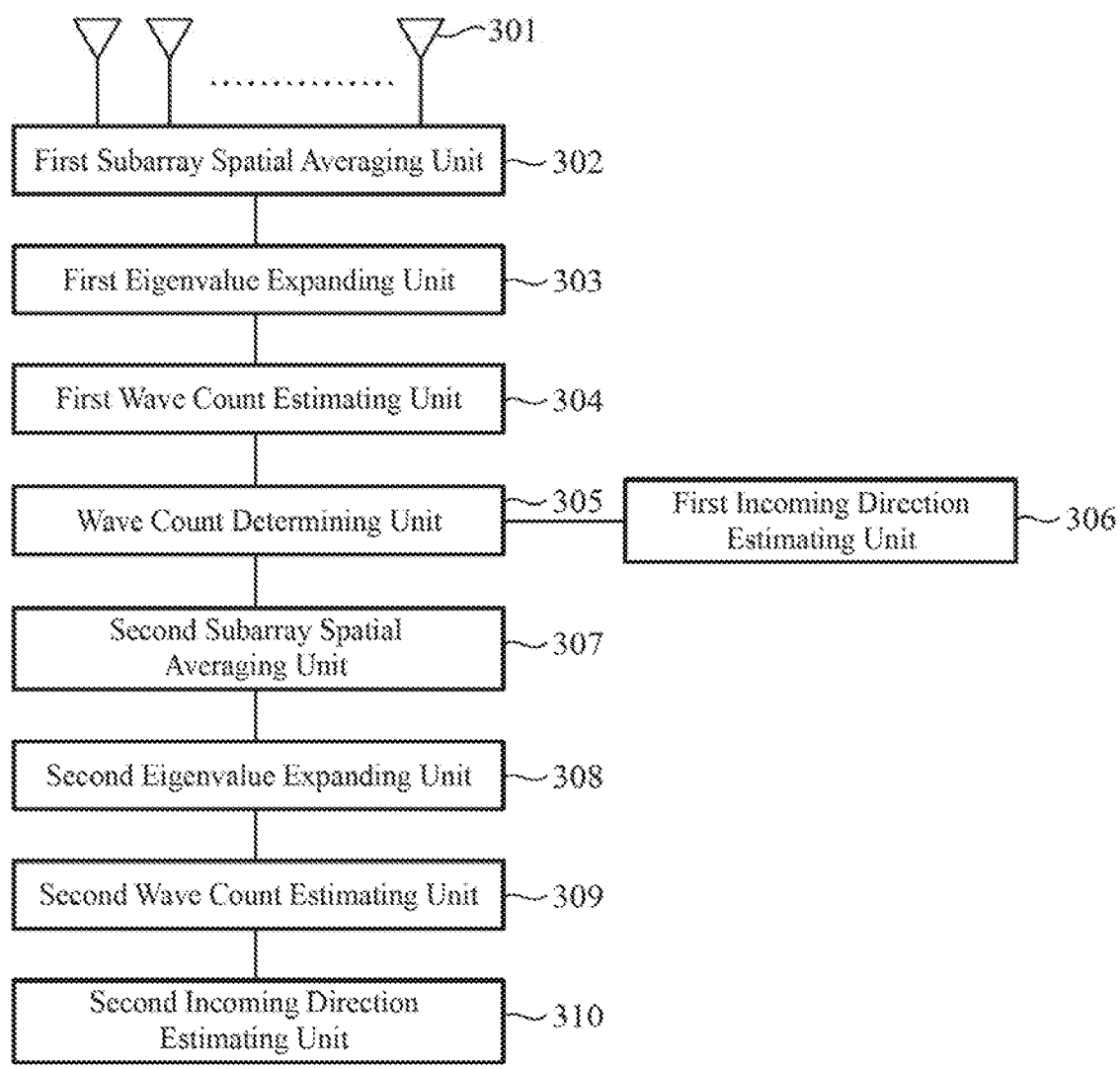
FIG. 9 is a configuration diagram of an incoming wave count incoming direction estimation apparatus according to a third embodiment of the present invention.

FIG. 9 is a configuration diagram illustrating the incoming wave count incoming direction estimation apparatus of the third embodiment.

The illustrated incoming wave count incoming direction estimation apparatus includes an array antenna 301, a first subarray spatial averaging unit 302, a first eigenvalue expanding unit 303, a first wave count estimating unit 304, a wave count determining unit 305, and a first incoming direction estimating unit 306, a second subarray spatial averaging unit 307, a second eigenvalue expanding unit 308, a second wave count estimating unit 309, and a second incoming direction estimating unit 310.

Here, the units from the array antenna 301 to the wave count determining unit 305 are similar to the units from the array antenna 201 to the wave count determining unit 205 of the second embodiment. Furthermore, the units from the second subarray spatial averaging unit 307 to the second wave count estimating unit 309 are similar to the units from the second subarray spatial averaging unit 206 to the second wave count estimating unit 208 of the second embodiment. Thus, description is omitted here for these components.

The first incoming direction estimating unit 306 is a functional unit for estimating the incoming direction by using a wave count estimation result of the first wave count estimating unit 304. Furthermore, the second incoming direction estimating unit 310 is a functional unit for estimating the incoming direction by using a wave count estimation result of the second wave count estimating unit 309.

Hereinafter, the operation of the incoming wave count incoming direction estimation apparatus of the third embodiment will be described by referring to a flowchart of FIG. 10. Here, steps ST301 to ST305 are similar to steps ST201 to ST205 of the second embodiment, and description thereof is therefore omitted here. In step ST305, when the wave count determining unit 305 determines that the wave count is less than or equal to the threshold value (step ST305—YES), the first incoming direction estimating unit 306 estimates the incoming direction by using the wave count estimation result obtained by the first wave count estimating unit 304 (step ST306). Furthermore, when the incoming direction is estimated by the first incoming direction estimating unit 306, this incoming direction estimated value and the wave count estimated value obtained by the first wave count estimating unit 304 are both output (step ST307).

Figure 11:
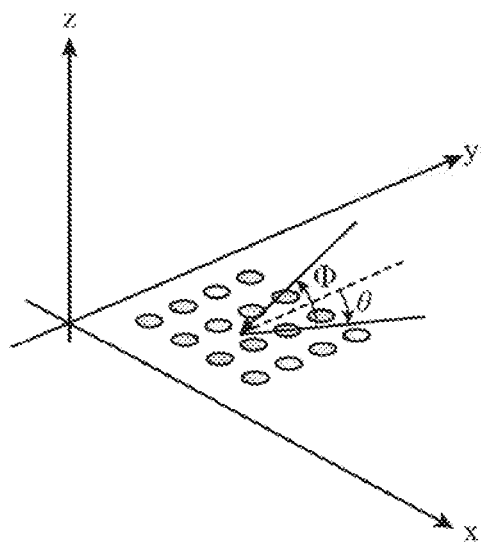
FIG. 11 is an explanatory diagram illustrating an azimuth angle θ and an elevation angle Φ.
Figure 12:
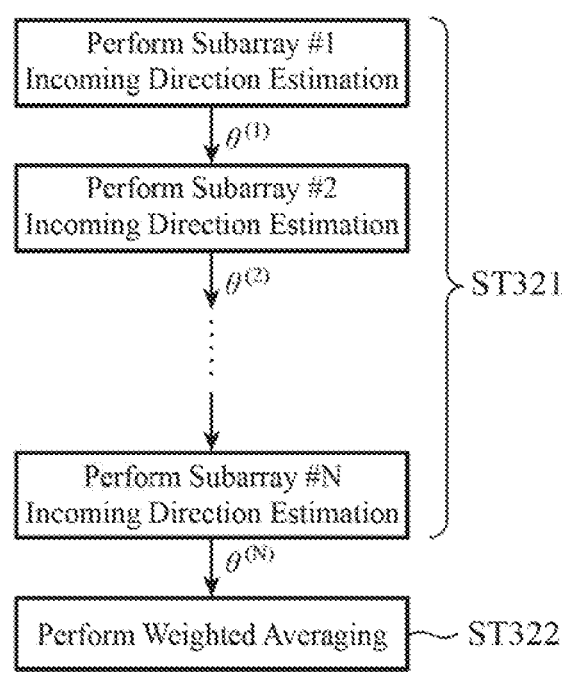
FIG. 12 is a flowchart illustrating operation of a first incoming direction estimating unit of the incoming wave count incoming direction estimation apparatus according to the third embodiment of the present invention.

As the operation of the first incoming direction estimating unit 306, first, it is considered to estimate an azimuth angle θ by using subarrays arranged in the x-axis direction. FIG. 11 illustrates the azimuth angle θ and an elevation angle Φ. Furthermore, FIG. 12 is a flowchart illustrating the operation of the first incoming direction estimating unit 306.

When the wave count estimated by the first wave count estimating unit 304 is one, the first incoming direction estimating unit 306 can estimate the incoming direction as indicated in the following equations (11) and (12) from eigenvectors obtained by the first eigenvalue expanding unit 303. When elements of an eigenvector corresponding to the maximum eigenvalue of the n-th subarray are e1^(n) and e2^(n), an incoming direction θ^(n) corresponding to the n-th subarray can be estimated as follows.

$$\theta^{(n)} := \sin^{-1}\left(\frac{\lambda}{2\pi d_x^{(n)}}\omega^{(n)}\right) \quad (n = 1, 2, \ldots, N) \quad (11)$$

Here, $$\omega^{(n)} := \arg\left(\frac{e_2^{(n)}}{e_1^{(n)}}\right) \quad (n = 1, 2, \ldots, N) \quad (12)$$

$$e^{(n)} := \begin{bmatrix} e_1^{(n)} & e_2^{(n)} \end{bmatrix}^T$$

where λ represents a wavelength of a transmission signal, dx^(n) represents an element interval of the n-th subarray, arg(x) represents calculation of a phase angle of x, and x^T represents the transpose of a matrix and a vector.

As is well known, when the element interval d^(n) is less than or equal to λ/2, the estimated θ^(n) has no ambiguity in the range of ±90° and the incoming direction is correctly estimated. However, when d^(n) is greater than or equal to 2/2, θ^(n) has uncertainty called angular ambiguity. On the other hand, when the element interval d^(n) is long, the estimation accuracy of the incoming direction is improved. Thus, as indicated in step ST321 of FIG. 12, it is considered to estimate the incoming direction with high accuracy without ambiguity by starting from an incoming direction estimated value θ^(1) obtained from an eigenvector of the (n=1)-th subarray having the shortest element interval, and gradually canceling the angular ambiguity. Here, it is assumed that d^(1) is less than or equal to λ/2. Next, it is assumed that an element interval d^(2) of the second subarray is greater than or equal to λ/2. In this case, a phase angle Φ^(n) obtained from the eigenvector has an uncertainty of an integral multiple of 2π. Thus, a plurality of incoming direction estimated values is prepared in consideration of the uncertainty of 2π as indicated in the following equation (13).

$$\theta^{(2,k)} := \sin^{-1}\left(\frac{\lambda}{2\pi d^{(2)}}(2\pi k + \omega^{(2)})\right) \quad (k = 1, 2, \ldots, K) \quad (13)$$

In the above equation, K can be defined as an integer greater than or equal to d^(2)/d^(1), for example. Among θ^(2, k) obtained in this way, a value closest to θ^(1) is obtained, whereby the ambiguity is removed, and an incoming direction estimated value θ^(2) can be obtained that is accurately estimated. By repeating the above processing for the plurality of subarrays, highly accurate incoming direction estimation can be achieved.

An elevation angle Φ can also be obtained as indicated in the following equation (14) by using arrays in the y direction.

$$\phi^{(n)} := \cos^{-1}\left(\frac{\lambda}{2\pi d_y^{(n)}}\omega^{(n)}\right) \quad (n = 1, 2, \ldots, N) \quad (14)$$

With this configuration, it is possible to remove the angular ambiguity similarly to the operation of the azimuth angle θ also for the elevation angle Φ.

It is assumed that the first incoming direction estimating unit 306 performs the above processing on arrays of the subarrays n=1, . . . N, and obtains incoming direction estimated values. The accuracy can be further improved by averaging the obtained incoming direction estimated value θ^(n) as indicated in the following equation (15) (step ST322 in FIG. 12).

$$\theta_{ave} := \frac{\sum_{n=1}^{N} a^{(n)} \theta^{(n)}}{\sum_{n=1}^{N} a^{(n)}} \quad (15)$$

Here, a^(n) is a weight and can be defined as indicated in the following equation (16), for example.

$$a^{(n)} := \frac{d^{(n)}\sqrt{M^{(n)}}}{d^{(1)}\sqrt{M^{(1)}}} \quad (16)$$

This is because it is known that the incoming direction estimation accuracy is inversely proportional to the element interval d^(n) and inversely proportional to the square root of the number of times of spatial averaging M^(n) of the correlation matrix (see, for example, Non-Patent Literature 1).

With the configuration as described above, the first incoming direction estimating unit 306 can accurately obtain the incoming direction estimated value without angular ambiguity.

Figure 10:
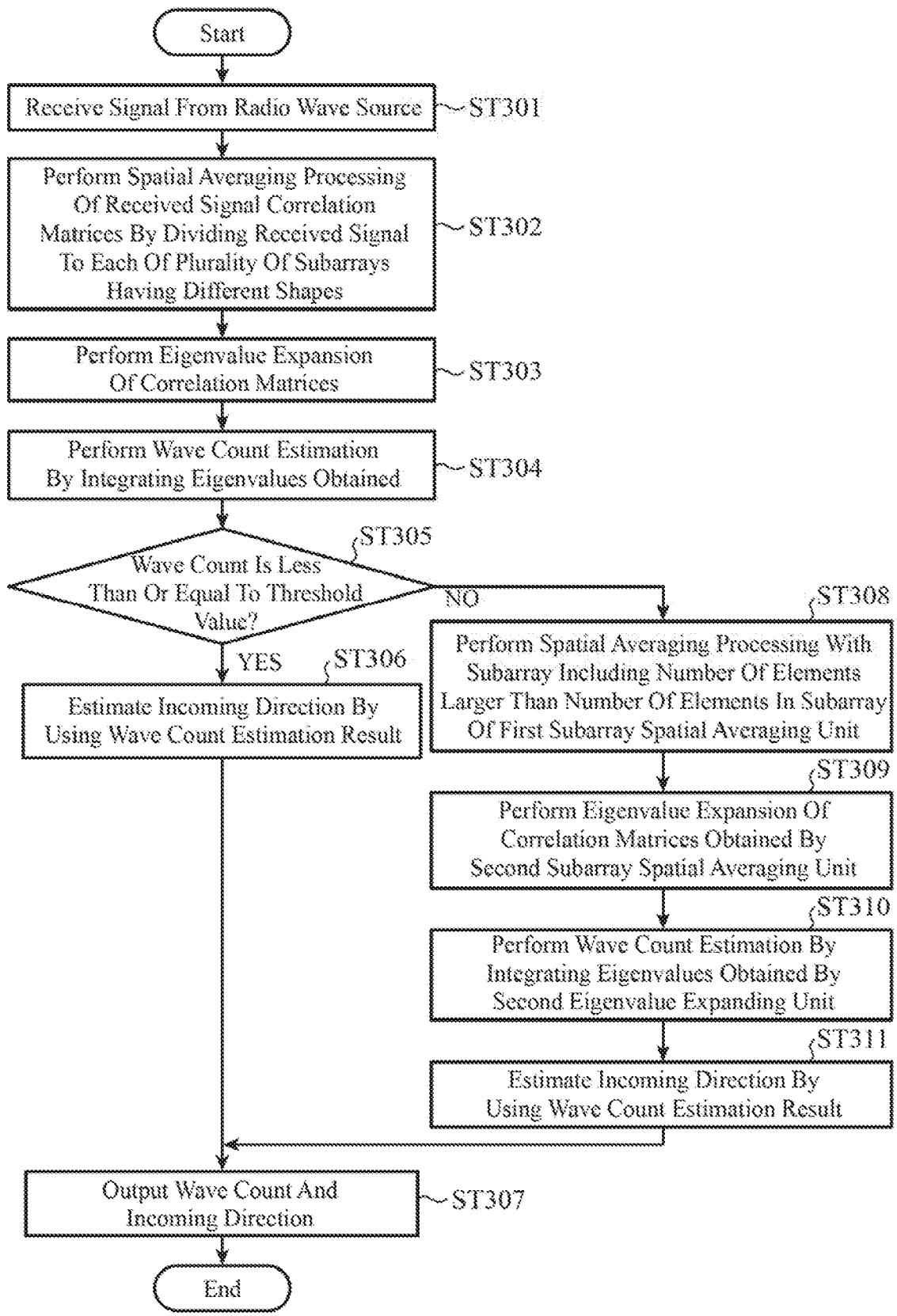
FIG. 10 is a flowchart illustrating operation of the incoming wave count incoming direction estimation apparatus according to the third embodiment of the present invention.

In the flowchart of FIG. 10, when the incoming wave count exceeds the threshold value in determination by the wave count determining unit 305 (step ST305—NO), the processing of steps ST308 to ST311 is performed. Here, steps ST308 to ST310 are similar to steps ST207 to ST209 of the second embodiment, and description thereof is therefore omitted. Next, the second incoming direction estimating unit 310 estimates the incoming direction by a subspace method (high-resolution incoming direction estimation method) such as MUSIC or ESPRIT by using the eigenvectors obtained by the second eigenvalue expanding unit 308 and the second wave count estimating unit 309 (step ST311). This processing is also described in, for example, H. Krim, M. Viberg, "Two Decades of Array Signal Processing Research", IEEE Signal Processing Magazine, vol. 13, no. 4, pp. 67-94, July 1996, and description thereof is therefore omitted here.

When the incoming direction estimated value by the second incoming direction estimating unit 310 is obtained in step ST311, the incoming direction estimated value is output together with the wave count estimated value by the second wave count estimating unit 309 obtained in step ST310 (step ST307).

Note that, in the above example, the incoming direction is estimated by using the incoming wave count estimation result of the incoming wave count estimation apparatus of the second embodiment; however, the incoming direction may be estimated by using the incoming wave count estimation result of the incoming wave count estimation apparatus of the first embodiment.

As described above, according to the incoming wave count incoming direction estimation apparatus of the third embodiment, the incoming wave count incoming direction estimation apparatus includes: an array antenna including a plurality of element antennas and for receiving a signal radiated from a radio wave source to be targeted; a first subarray spatial averaging unit for performing spatial averaging of correlation matrices by dividing a received signal of the array antenna to a plurality of subarrays having different shapes and calculating these correlation matrices for the respective subarrays having different shapes; a first eigenvalue expanding unit for performing eigenvalue expansion of correlation matrices for the respective plurality of subarrays having different shapes after spatial averaging obtained by the first subarray spatial averaging unit; a first wave count estimating unit for estimating an incoming wave count by integrating eigenvalues for the respective plurality of subarrays having different shapes obtained by the first eigenvalue expanding unit; a wave count determining unit for determining whether or not the incoming wave count estimated by the first wave count estimating unit exceeds a set threshold value; a first incoming direction estimating unit for estimating an incoming direction by using an estimated value of the incoming wave count obtained by the first wave count estimating unit when the incoming wave count is less than or equal to the threshold value in the wave count determining unit; a second subarray spatial averaging unit for performing spatial averaging of correlation matrices by performing division to subarrays having a larger number of elements than the subarrays divided by the first subarray spatial averaging unit when the incoming wave count exceeds the threshold value in the wave count determining unit; a second eigenvalue expanding unit for performing eigenvalue expansion of correlation matrices obtained by the second subarray spatial averaging unit; a second wave count estimating unit for estimating the incoming wave count by integrating eigenvalues of the plurality of subarrays obtained by the second eigenvalue expanding unit; and a second incoming direction estimating unit for estimating the incoming direction by a high-resolution incoming direction estimation method on the basis of an estimated value of the incoming wave count obtained by the second wave count estimating unit, so that it is possible to estimate the incoming wave count and the incoming direction with high accuracy, and it is possible to reduce the amount of calculation of entire processing of the incoming wave count and incoming direction estimation.

Furthermore, according to the incoming wave count incoming direction estimation apparatus of the third embodiment, the first incoming direction estimating unit estimates the incoming direction on the basis of an eigenvector obtained by the first eigenvalue expanding unit, so that it is possible to estimate the incoming direction with high accuracy.

Furthermore, according to the incoming wave count incoming direction estimation apparatus of the third embodiment, the second incoming direction estimating unit estimates the incoming direction by using an eigenvector obtained by the second eigenvalue expanding unit and an eigenvector obtained by the second wave count estimating unit and applying the high-resolution incoming direction estimation method, so that it is possible to estimate the incoming direction with higher accuracy.

Furthermore, according to the incoming wave count incoming direction estimation apparatus of the third embodiment, the first incoming direction estimating unit estimates the incoming direction in order from one of the subarrays with a short element interval on the basis of an eigenvector obtained by the first eigenvalue expanding unit, removes angular ambiguity of one of the subarrays with a long element interval by using the incoming direction estimated, and finally estimates the incoming direction, so that it is possible to estimate the incoming direction with high accuracy without angular ambiguity.

Furthermore, according to the incoming wave count incoming direction estimation apparatus of the third embodiment, the first incoming direction estimating unit estimates incoming directions from eigenvectors of the plurality of subarrays on the basis of the eigenvectors obtained by the first eigenvalue expanding unit, and weights estimated values of these incoming directions by the number of times of spatial averaging and an element interval, and then performs averaging to obtain a final incoming direction estimated value, so that it is possible to estimate the incoming direction with high accuracy without angular ambiguity.

Fourth Embodiment

Figure 13:
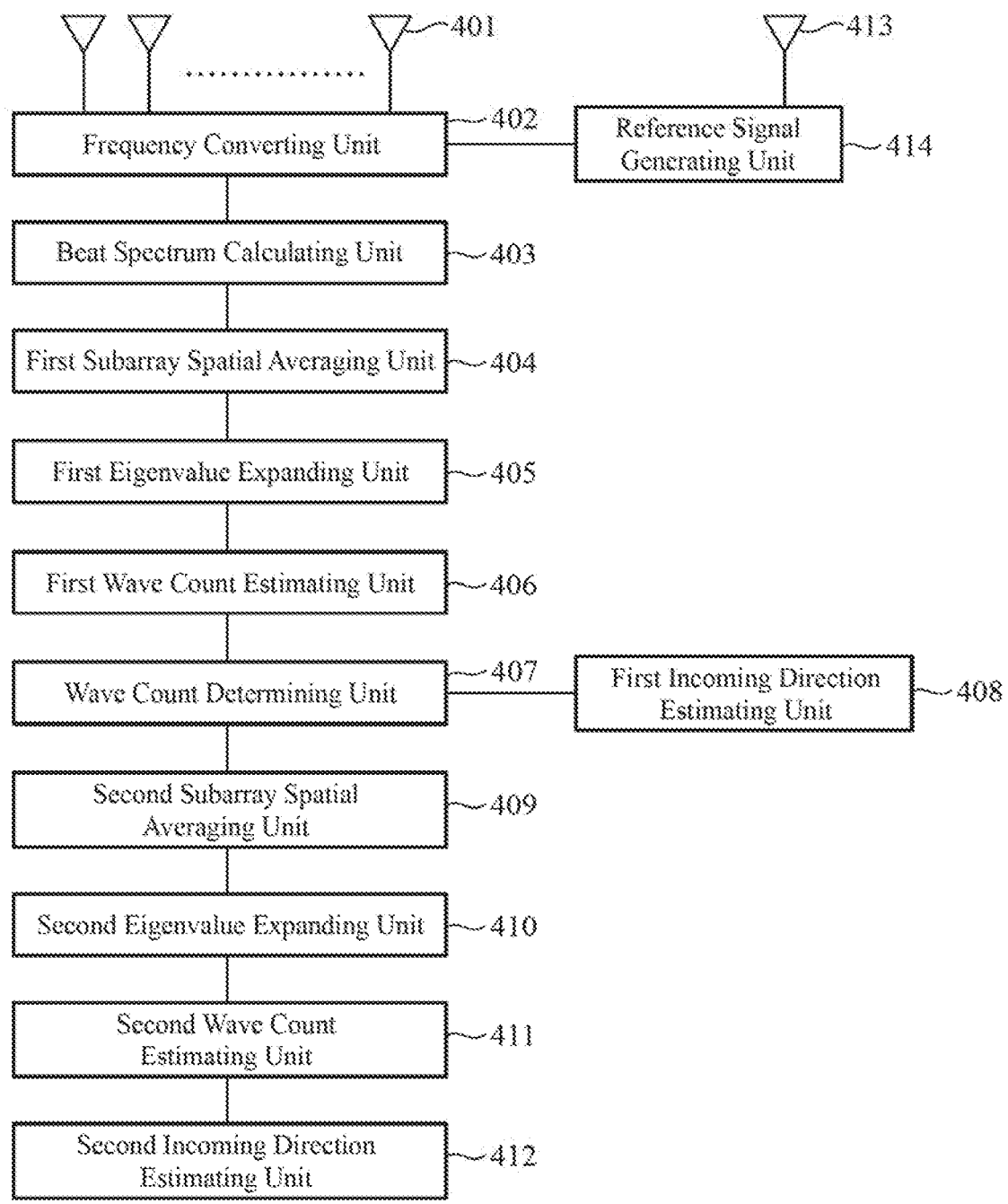
FIG. 13 is a configuration diagram of an incoming wave count incoming direction estimation apparatus according to a fourth embodiment of the present invention.

The fourth embodiment is an example of an incoming wave count incoming direction estimation apparatus when operating as a radar. Here, a vehicle-mounted radar will be described as an example; however, the apparatus is also applicable to other radars. FIG. 13 illustrates a configuration of the incoming wave count incoming direction estimation apparatus of the fourth embodiment.

The incoming wave count incoming direction estimation apparatus illustrated in FIG. 13 includes an array antenna 401, a frequency converting unit 402, a beat spectrum calculating unit 403, a first subarray spatial averaging unit 404, a first eigenvalue expanding unit 405, a first wave count estimating unit 406, a wave count determining unit 407, a first incoming direction estimating unit 408, a second subarray spatial averaging unit 409, a second eigenvalue expanding unit 410, a second wave count estimating unit 411, a second incoming direction estimating unit 412, a transmission antenna 413, and a reference signal generating unit 414. Here, the units from the first subarray spatial averaging unit 404 to the second incoming direction estimating unit 412 have configurations similar to those of the units from the first subarray spatial averaging unit 302 to the second incoming direction estimating unit 310 of the third embodiment, and description thereof is therefore omitted here.

The reference signal generating unit 414 is a functional unit for generating a linear frequency modulated signal or a pulse signal as a reference signal. The transmission antenna 413 is an antenna for radiating the reference signal generated by the reference signal generating unit 414 into the air. The frequency converting unit 402 is a functional unit for obtaining a beat signal by mixing the reference signal generated by the reference signal generating unit 414 with a signal received by the array antenna 401. The beat spectrum calculating unit 403 is a functional unit for obtaining a beat spectrum by performing Fourier transform on the beat signal obtained by the frequency converting unit 402.

Figure 14:
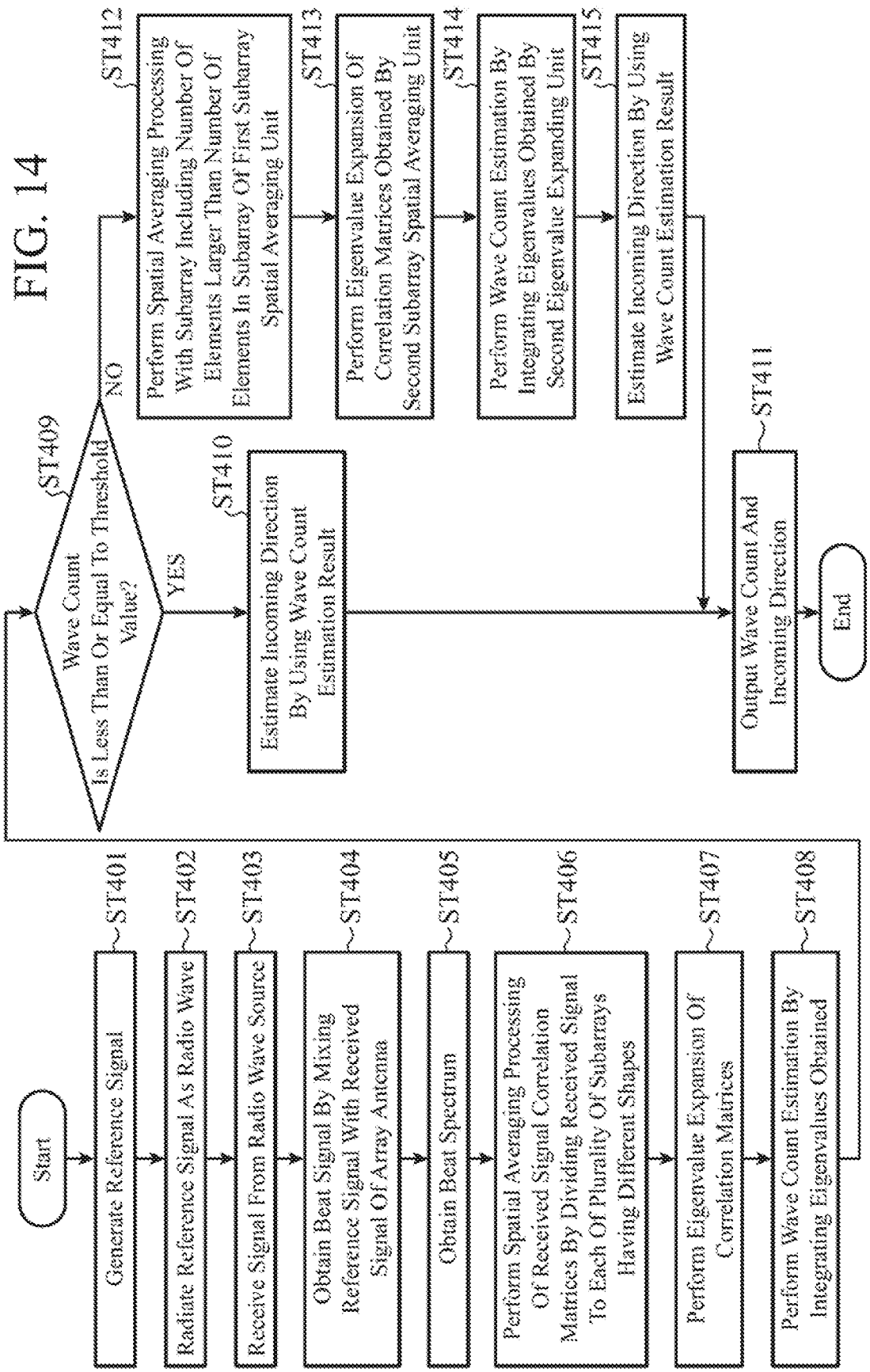
FIG. 14 is a flowchart illustrating operation of the incoming wave count incoming direction estimation apparatus according to the fourth embodiment of the present invention.

Next, the operation of the incoming wave count incoming direction estimation apparatus of the fourth embodiment will be described by referring to a flowchart of FIG. 14.

The reference signal generating unit 414 generates a chirp (linear frequency modulation) signal or a pulsed chirp signal as the reference signal, which is sent to the transmission antenna 413 after passing through a filter and an amplifier (not illustrated) (step ST401). The transmission antenna 413 radiates the reference signal sent from the reference signal generating unit 414 as a radio wave in a target direction (step ST402). The array antenna 401 receives the reference signal hitting a target and reflected, and performs processing such as amplification and band limitation (step ST403). The frequency converting unit 402 obtains the beat signal by mixing the reference signal generated by the reference signal generating unit 414 with the received signal sent from the array antenna 401 (step ST404). The beat spectrum calculating unit 403 obtains the beat spectrum by performing Fourier transform on the beat signal (step ST405).

The processing of step ST405 by the beat spectrum calculating unit 403 will be described. In the case of the FMCW radar, the beat signal for each reception antenna or each subarray obtained by the frequency converting unit 402 is subjected to FFT, and is compared with a noise set threshold value in advance. Alternatively, Constant False Alarm Rate (CFAR) processing is performed to detect a target signal peak. A complex signal of a plurality of the peaks detected for each antenna or each subarray is sent to the first subarray spatial averaging unit 404. A configuration may be adopted in which a value comparing the power of the peak of a target candidate with the power around the peak is calculated as an SNR at the time of detection, at this time.

When the reference signal is a pulsed chirp signal (also called Fast Chirp), a two-dimensional array of beat signals within a pulse repetition period (Fast time) and between pulse repetition periods (Slow time) is constructed, and FFT is performed in each of the Fast time direction and the slow time direction, whereby a two-dimensional (relative velocity and distance) beat spectrum is obtained. Processing similar to that for FMCW is extended in two dimensions and performed on the obtained beat spectrum, whereby a plurality of the target signal peaks are obtained. The subsequent processing is similar to that in the case of FMCW described above.

The first subarray spatial averaging unit 404 performs spatial averaging by using the beat spectrum obtained by the beat spectrum calculating unit 403, by dividing the array antenna 401 to a plurality of subarrays having different shapes, and by calculating correlation matrices for the respective subarrays having different shapes (step ST406). The first eigenvalue expanding unit 405 performs eigenvalue expansion (step ST407), and the first wave count estimating unit 406 performs wave count estimation by integrating the obtained eigenvalues (step ST408). Here, the first wave count estimating unit 406 can be configured to set the threshold value $\alpha\_th$ in the wave count estimating unit 104 described in the first embodiment on the basis of the detected SNR obtained by the beat spectrum calculating unit 403. For example, it is possible to set a value of the SNR at the time of detection as $\alpha\_th$ as it is. Subsequent steps ST409 to ST415 are similar to steps ST305 to ST311 in the third embodiment, and description thereof is therefore omitted here.

As described above, according to the incoming wave count incoming direction estimation apparatus of the fourth embodiment, the incoming wave count incoming direction estimation apparatus includes: a reference signal generating unit for generating a linear frequency modulated signal or a pulse signal as a reference signal; a transmission antenna for radiating the reference signal into the air; an array antenna including a plurality of element antennas and for receiving a signal obtained from the reference signal radiated from the transmission antenna and reflected by a radio wave source to be targeted; a frequency converting unit for obtaining a beat signal by mixing the reference signal with the signal received by the array antenna; a beat spectrum calculating unit for obtaining a beat spectrum by performing a Fourier transform on the beat signal obtained by the frequency converting unit; a first subarray spatial averaging unit for performing spatial averaging by using the beat spectrum, by dividing the array antenna into a plurality of subarrays having different shapes, and by calculating correlation matrices for the respective subarrays having different shapes; a first eigenvalue expanding unit for performing eigenvalue expansion of correlation matrices for the respective plurality of subarrays having different shapes obtained by the first subarray spatial averaging unit; a first wave count estimating unit for estimating an incoming wave count by integrating eigenvalues for the respective plurality of subarrays having different shapes obtained by the first eigenvalue expanding unit; a wave count determining unit for determining whether or not the wave count estimated by the first wave count estimating unit exceeds a set threshold value; a first incoming direction estimating unit for estimating an incoming direction when the wave count does not exceed the threshold value in the wave count determining unit; a second subarray spatial averaging unit for performing spatial averaging of correlation matrices by performing division to subarrays having a larger number of elements than the subarrays divided by the first subarray spatial averaging unit when the wave count exceeds the threshold value in the wave count determining unit; a second eigenvalue expanding unit for performing eigenvalue expansion of correlation matrices obtained by the second subarray spatial averaging unit; a second wave count estimating unit for estimating the incoming wave count by integrating eigenvalues of the plurality of subarrays obtained by the second eigenvalue expanding unit; and a second incoming direction estimating unit for estimating the incoming direction by a high-resolution method on the basis of the incoming wave count obtained by the second wave count estimating unit, so that it is possible to estimate the incoming wave count and the incoming direction with high accuracy even when operating as a radar.

Note that, in each of the above-described embodiments, an example has been described of application to the vehicle-mounted radar for the purpose of collision prevention or autonomous driving; however, the embodiments can be applied not only to vehicle-mounted radars, but also to aircraft surveillance radars and weather radars. Furthermore, it can be applied to receiving apparatuses such as an interfering radio wave receiving apparatus and a satellite communication apparatus.

In the invention of the present application, within the scope of the invention, free combination of the embodiments, a modification of an arbitrary component of the embodiments, or omission of an arbitrary component in the embodiments is possible.

INDUSTRIAL APPLICABILITY

As described above, the incoming wave count estimation apparatus according to the present invention relates to a configuration for estimating the incoming wave count by performing eigenvalue expansion on a plurality of subarrays having different shapes after performing spatial averaging, and integrating eigenvalues of the respective subarrays obtained, and is suitable for use in vehicle-mounted radars, aircraft surveillance radars, and weather radars.

REFERENCE SIGNS LIST 101, 201, 301, 401: array antenna, 102: subarray spatial averaging unit, 103: eigenvalue expanding unit, 104: wave count estimating unit, 202, 302, 404: first subarray spatial averaging unit, 203, 303, 405: first eigenvalue expanding unit, 204, 304, 406: first wave count estimating unit, 205, 305, 407: wave count determining unit, 206, 307, 409: second subarray spatial averaging unit, 207, 308, 410: second eigenvalue expanding unit, 208, 309, 411: second wave count estimating unit, 306, 408: first incoming direction estimating unit, 310, 412: second incoming direction estimating unit, 402: frequency converting unit, 403: beat spectrum calculating unit, 413: transmission antenna, 414: reference signal generating unit

The invention claimed is:

1. An incoming wave count estimation apparatus comprising:
an array antenna including a plurality of element antennas and for receiving a signal radiated from a radio wave source to be targeted; and
processing circuitry performing a process of:
performing spatial averaging of correlation matrices by dividing a received signal of the array antenna to a plurality of subarrays having different shapes and calculating these correlation matrices for the respective subarrays having different shapes;
performing eigenvalue expansion of correlation matrices for the respective plurality of subarrays having different shapes after spatial averaging obtained; and
estimating an incoming wave count by integrating eigenvalues for the respective plurality of subarrays having different shapes obtained.

2. The incoming wave count estimation apparatus according to claim 1, wherein the process estimates the wave count from an eigenvalue distribution after weighted averaging of the eigenvalues for the respective plurality of subarrays having different shapes.

3. The incoming wave count estimation apparatus according to claim 1, wherein the process estimates the wave count by obtaining ratios for the respective element antennas of the eigenvalues for the respective plurality of subarrays having different shapes, and then comparing the ratios for each of the subarrays, and comparing a minimum or maximum value with a threshold value.

4. An incoming wave count estimation apparatus comprising:
an array antenna including a plurality of element antennas and for receiving a signal radiated from a radio wave source to be targeted; and
processing circuitry performing a process of:
performing spatial averaging of correlation matrices by dividing a received signal of the array antenna to a plurality of subarrays having different shapes and calculating these correlation matrices for the respective subarrays having different shapes;
performing eigenvalue expansion of correlation matrices for the respective plurality of subarrays having different shapes after spatial averaging obtained;
estimating an incoming wave count by integrating eigenvalues for the respective plurality of subarrays having different shapes obtained;
determining whether or not the incoming wave count estimated exceeds a set threshold value;
performing spatial averaging of correlation matrices by performing division to subarrays having a larger number of elements than the subarrays divided when the incoming wave count exceeds the threshold value;
performing eigenvalue expansion of correlation matrices obtained; and
estimating the incoming wave count by integrating eigenvalues of the plurality of subarrays obtained, wherein the incoming wave count estimated is output when the incoming wave count is less than or equal to the threshold value in determination.

5. An incoming wave count incoming direction estimation apparatus comprising:
an array antenna including a plurality of element antennas and for receiving a signal radiated from a radio wave source to be targeted; and
processing circuitry performing a process of:
performing spatial averaging of correlation matrices by dividing a received signal of the array antenna to a plurality of subarrays having different shapes and calculating these correlation matrices for the respective subarrays having different shapes;
performing eigenvalue expansion of correlation matrices for the respective plurality of subarrays having different shapes after spatial averaging obtained;
estimating an incoming wave count by integrating eigenvalues for the respective plurality of subarrays having different shapes obtained;
determining whether or not the incoming wave count estimated exceeds a set threshold value;
estimating an incoming direction by using an estimated value of the incoming wave count obtained when the incoming wave count is less than or equal to the threshold value;
performing spatial averaging of correlation matrices by performing division to subarrays having a larger number of elements than the subarrays divided when the incoming wave count exceeds the threshold value;
performing eigenvalue expansion of correlation matrices obtained;
estimating the incoming wave count by integrating eigenvalues of the plurality of subarrays obtained; and
estimating the incoming direction by a high-resolution incoming direction estimation method on a basis of an estimated value of the incoming wave count obtained.

6. The incoming wave count incoming direction estimation apparatus according to claim 5, wherein the process estimates the incoming direction on a basis of an eigenvector obtained.

7. The incoming wave count incoming direction estimation apparatus according to claim 5, wherein the process estimates the incoming direction by using an eigenvector obtained and an eigenvector obtained and applying the high-resolution incoming direction estimation method.

8. The incoming wave count incoming direction estimation apparatus according to claim 5, wherein the process estimates the incoming direction in order from one of the subarrays with a short element interval on a basis of an eigenvector obtained, removes angular ambiguity of one of the subarrays with a long element interval by using the incoming direction estimated, and finally estimates the incoming direction.

9. The incoming wave count incoming direction estimation apparatus according to claim 5, wherein the process estimates incoming directions from eigenvectors of the plurality of subarrays on a basis of the eigenvectors obtained, and weights estimated values of these incoming directions by a number of times of spatial averaging and an element interval, and then performs averaging to obtain a final incoming direction estimated value.

10. An incoming wave count incoming direction estimation apparatus comprising:
a transmission antenna for radiating a reference signal into air;
an array antenna including a plurality of element antennas and for receiving a signal obtained from the reference signal radiated from the transmission antenna and reflected by a radio wave source to be targeted; and
processing circuitry performing a process of:
generating a linear frequency modulated signal or a pulse signal as the reference signal;
obtaining a beat signal by mixing the reference signal with the signal received by the array antenna;
obtaining a beat spectrum by performing a Fourier transform on the beat signal obtained;
performing spatial averaging by using the beat spectrum, by dividing the array antenna into a plurality of subarrays having different shapes, and by calculating correlation matrices for the respective subarrays having different shapes;
performing eigenvalue expansion of correlation matrices for the respective plurality of subarrays having different shapes obtained;

estimating an incoming wave count by integrating eigenvalues for the respective plurality of subarrays having different shapes obtained;

determining whether or not the incoming wave count estimated exceeds a set threshold value;

estimating an incoming direction when the wave count does not exceed the threshold value;

performing spatial averaging of correlation matrices by performing division to subarrays having a larger number of elements than the subarrays divided when the wave count exceeds the threshold value;

performing eigenvalue expansion of correlation matrices obtained;

estimating the incoming wave count by integrating eigenvalues of the plurality of subarrays obtained; and estimating the incoming direction by a high-resolution method on a basis of the incoming wave count obtained.

\* \* \* \* \*